United States Patent
Jang et al.

(10) Patent No.: US 11,114,690 B2
(45) Date of Patent: Sep. 7, 2021

(54) METHOD OF MANUFACTURING SOLID ELECTROLYTE FOR ALL-SOLID CELLS, SOLID ELECTROLYTE MANUFACTURED USING THE METHOD, AND ALL-SOLID CELL INCLUDING THE SOLID ELECTROLYTE

(71) Applicants: Hyundai Motor Company, Seoul (KR); Kia Motors Corporation, Seoul (KR)

(72) Inventors: Yong Jun Jang, Gyeonggi-do (KR); Pil Gun Oh, Seoul (KR); Hong Seok Min, Gyeonggi-do (KR); Yong Sub Yoon, Seoul (KR); Sa Heum Kim, Gyeonggi-do (KR); Ju Yeong Seong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 33 days.

(21) Appl. No.: 16/379,239

(22) Filed: Apr. 9, 2019

(65) Prior Publication Data
US 2020/0119394 A1   Apr. 16, 2020

(30) Foreign Application Priority Data
Oct. 16, 2018   (KR) .................. 10-2018-0123188

(51) Int. Cl.
| | | |
|---|---|---|
| *H01M 10/0565* | (2010.01) | |
| *H01M 10/0562* | (2010.01) | |
| *H01M 10/0585* | (2010.01) | |
| *H01M 4/38* | (2006.01) | |
| *H01M 10/058* | (2010.01) | |

(Continued)

(52) U.S. Cl.
CPC ......... *H01M 10/0562* (2013.01); *C01B 25/14* (2013.01); *H01B 1/00* (2013.01); *H01B 1/08* (2013.01); *H01M 4/382* (2013.01); *H01M 10/052* (2013.01); *H01M 10/058* (2013.01); *H01M 10/0525* (2013.01); *H01M 10/0585* (2013.01); *H01M 2220/20* (2013.01); *H01M 2300/0068* (2013.01);

(Continued)

(58) Field of Classification Search
CPC ......... H01M 10/0562; H01M 10/0585; H01M 4/382; H01M 2220/20; H01M 2300/0068; H01M 10/052; H01M 10/058; H01M 10/0525; H01M 2300/0091; Y02T 10/70; Y02E 60/10; C01B 25/14
See application file for complete search history.

(56) References Cited

U.S. PATENT DOCUMENTS

2016/0093915 A1* 3/2016 Yamamoto ........ H01M 10/0525
429/126

FOREIGN PATENT DOCUMENTS

JP   2004-193112 A   7/2004

* cited by examiner

*Primary Examiner* — Cynthia K Walls
(74) *Attorney, Agent, or Firm* — Mintz Levin Cohn Ferris Glovsky and Popeo, P.C.; Peter F. Corless

(57) ABSTRACT

Disclosed are a method of manufacturing a solid electrolyte, a solid electrolyte manufactured using the method, and an all-solid cell including the solid electrolyte. The method includes preparing an electrolyte admixture including a solid electrolyte precursor and a solvent, drying the electrolyte admixture and removing the solvent from the electrolyte admixture to form a dry electrolyte mixture, and heat-treating the dry electrolyte mixture to form a crystallized solid electrolyte.

13 Claims, 6 Drawing Sheets

(51) Int. Cl.
  *C01B 25/14* (2006.01)
  *H01M 10/0525* (2010.01)
  *H01M 10/052* (2010.01)
  *H01B 1/00* (2006.01)
  *H01B 1/08* (2006.01)
(52) U.S. Cl.
  CPC ...... *H01M 2300/0091* (2013.01); *Y02E 60/10* (2013.01); *Y02T 10/70* (2013.01)

METHOD OF MANUFACTURING SOLID ELECTROLYTE FOR ALL-SOLID CELLS, SOLID ELECTROLYTE MANUFACTURED USING THE METHOD, AND ALL-SOLID CELL INCLUDING THE SOLID ELECTROLYTE

CROSS-REFERENCE TO RELATED APPLICATION

This application claims, under 35 U.S.C. § 119(a), the benefit of priority to Korean Patent Application No. 10-2018-0123188 filed on Oct. 16, 2018, the entire contents of which are incorporated herein by reference.

TECHNICAL FIELD

The present invention relates to a method of manufacturing a solid electrolyte, a solid electrolyte manufactured using the method, and an all-solid cell including the solid electrolyte. In particular, the method may produce a crystallized solid electrolyte at substantially improved yield without performing a milling process, thereby enabling energy to be saved.

BACKGROUND

In recent years, secondary batteries have been widely used as high-performance energy sources for small-sized portable electronic devices, such as mobile phones, video cameras, and laptop computers, as well as large-capacity power storage batteries for vehicles and power storage systems. With an increase in the number of fields to which secondary batteries are applied, research to reduce the weight of parts constituting portable electronic devices and the power consumption of the portable electronic devices has been conducted in order to reduce the size of the portable electronic devices and to enable continuous use of the portable electronic devices for a long time. Therefore, there is a necessity for a secondary battery having reduced sized and increased capacity.

In particular, a lithium secondary battery, which is one type of secondary battery, has advantages in that the lithium secondary battery has higher energy density, a larger capacity per unit area, a lower self-discharge rate, and a longer lifespan than a nickel-manganese battery or a nickel-cadmium battery. In addition, since the lithium secondary battery does not have a memory effect, the lithium secondary battery is convenient to use, and exhibits a long lifespan. As a next-generation battery for electric vehicles, however, the lithium secondary battery has low stability, low energy density, and low output. In particular, the lithium secondary battery uses a combustible organic solvent as an electrolyte solvent. When a short circuit occurs in the lithium secondary battery due to physical damage to the lithium secondary battery, therefore, the lithium secondary battery may easily explode or catch fire. Actually, a large number of accidents have occurred due to the lithium secondary battery.

In recent years, therefore, an all-solid cell that uses a solid electrolyte, rather than a liquid electrolyte, as an electrolyte in order to improve the safety thereof has attracted considerable attention. Since the all-solid cell uses an incombustible or flame-retardant solid electrolyte instead of a combustible liquid electrolyte, a problem related to catching fire, which occurs due to the liquid electrolyte, is prevented. In addition, a bipolar structure can be controlled, whereby the energy density of the all-solid cell may be increased so as to be five times as high as that of a conventional all-solid cell. The solid electrolyte, which is the core element of the all-solid cell, can include an oxide-based material and a sulfur-based material as main components.

Meanwhile, conventionally, a method of manufacturing a sulfur-based solid electrolyte using a starting material obtained by mixing and vitrifying $Li_2S$ and $P_2S_5$ has been used. In the conventional method of manufacturing the solid electrolyte, however, a very expensive compound, costing for example about 500 million Korean won/kg, such as $Li_2S$, is used as the starting material, mass-production is limited, and the control of particle sizes is limited. These problems are the largest obstacles to commercializing a battery based on large-sized energy storage technology. Therefore, there is a necessity for a new solid electrolyte composition method that is capable of solving the above problems.

The above information disclosed in this Background section is provided only for enhancement of understanding of the background of the invention and therefore it may contain information that does not form the prior art that is already known in this country to a person of ordinary skill in the art.

SUMMARY OF THE INVENTION

In preferred aspects, provided are a method of manufacturing a solid electrolyte using a solution method without performing a milling process, a method of manufacturing a solid electrolyte that is capable of producing a crystallized solid electrolyte at substantially improved yield, and a solid electrolyte having lithium ion conductivity suitable for a secondary battery and an all-solid cell having a discharge capacity suitable for a secondary battery.

The term "all-solid cell" or "all-solid battery" as used herein refers to a cell or a battery that includes only solid or substantially solid-state components, such as solid state electrodes (e.g. anode and cathode) and solid electrolyte. Thus, in preferred aspect, an all-solid cell will not include a fluid and/or flowable electrolyte component as a material or component.

The aspects of the present invention are not limited to those described above. The aspects of the present invention will be clearly understood from the following description and could be implemented by means defined in the claims and a combination thereof.

In one aspect, provided is a method of manufacturing a solid electrolyte for all-solid cells. The method may include preparing an electrolyte admixture including a solid electrolyte precursor and a solvent, drying the electrolyte admixture and removing the solvent to form a dry electrolyte mixture, and heat-treating the dry electrolyte mixture to form a crystallized solid electrolyte. Preferably, the solid electrolyte precursor may be dissolved in the solvent.

Preferably, no milling process may be performed.

The solid electrolyte precursor may suitably include one or more selected from the group consisting of a lithium (Li) element, a sulfur (S) element, a phosphorus (P) element, a brome (Br) element, an iodine (I) element, lithium sulfide ($Li_2S$), phosphorus pentasulfide ($P_2S_5$), lithium bromide (LiBr), lithium chloride (LiCl), and lithium iodide (LiI).

The solvent may suitably include one or more selected from the group consisting of ethanol, propanol, butanol, dimethyl carbonate, ethyl acetate, tetrahydrofuran, 1,2-dimethoxyethane, propylene glycol dimethyl ether, and acetonitrile.

Preferably, the electrolyte admixture may include lithium (Li), phosphorus (P), sulfur (S), and chlorine (Cl) at a molar ratio of about 6:1:5:1.

Preferably, the drying may be performed at a temperature of about 25° C. to 200° C. for about 1 to 3 hours.

Preferably, the heat treatment may be performed at a temperature of about 400° C. to 600° C.

The crystallized solid electrolyte may have an argyrodite-type crystalline structure.

The term "argyrodite" or "argyrodite-type crystal structure" as used herein refers to an orthorhombic crystal structure similar to similar to naturally existing $Ag_8GeS6$ (Argyrodite). For example, the Argyrodite crystal may be orthorhombic having $Pna2_1$ space group and having a unit cell of a=15.149, b=7.476, c=10.589 [Å]; Z=4.

The crystallized solid electrolyte may have an argyrodite-type crystalline structure including $PS_4^{-3}$.

In another aspect, provided is a solid electrolyte manufactured using the method described herein and an all-solid cell including the same.

The all-solid cell may include a solid electrolyte layer including the solid electrolyte, a positive electrode disposed on a first surface of the solid electrolyte layer, the positive electrode including the solid electrolyte, and a negative electrode disposed on a second surface of the solid electrolyte layer. The first surface and the second surface of the solid electrolyte layer are opposite surfaces.

The positive electrode may further include an active material and a conductive agent, and the negative electrode may include a lithium (Li) element.

Further provided is a vehicle include the all-solid cell as described herein.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1:
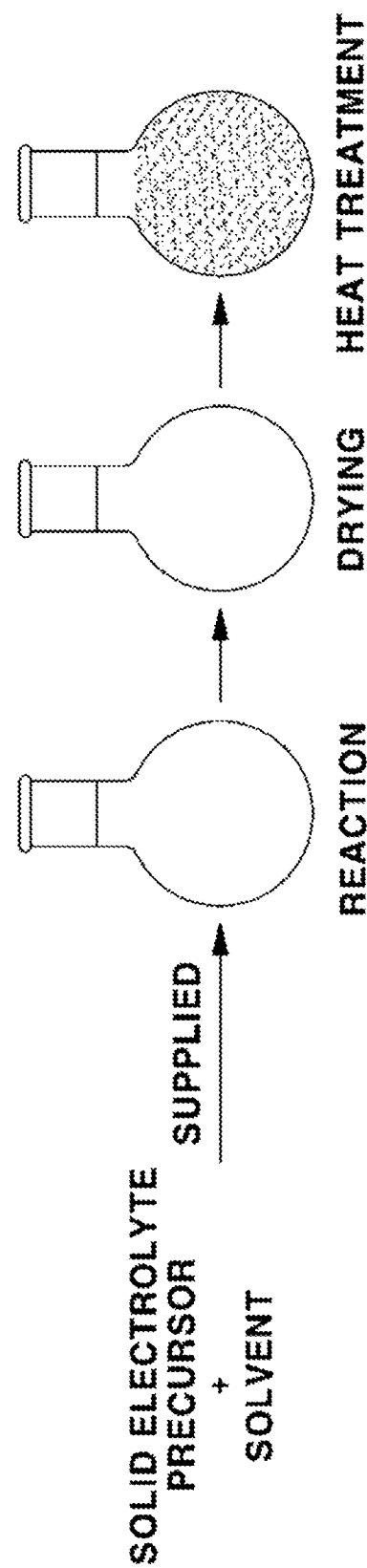
FIG. 1 shows an exemplary method of manufacturing an exemplary solid electrolyte for an exemplary all-solid cell according to an exemplary embodiment of the present invention.

Hereinafter reference will now be made in detail to various embodiments of the present invention, examples of which are illustrated in the accompanying drawings and described below. However, the present invention may be embodied in many different forms and should not be construed as limited to the embodiments set forth herein. Rather, these embodiments are provided so that this invention will be thorough and complete, and will fully convey the scope of the invention to those skilled in the art. The present invention is defined only by the categories of the claims. Wherever possible, the same reference numbers will be used throughout the drawings to refer to the same or like parts.

Unless otherwise defined, all terms, including technical and scientific terms, used in this specification have the same meaning as commonly understood by a person having ordinary skill in the art to which the present invention pertains. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

In addition, the terms used in this specification are provided only to explain specific embodiments, but are not intended to restrict the present invention. A singular representation may include a plural representation unless it represents a definitely different meaning from the context. It will be further understood that the terms "comprises", "has" and the like, when used in this specification, specify the presence of stated elements, features, numbers, steps, and/or operations, but do not preclude the presence or addition of one or more other elements, features, numbers, steps, and/or operations. It will be understood that the term "and/or" refers to one or more possible combinations of specified relevant items and includes such combinations.

In addition, it will be understood that, when an element such as a layer, film, region or substrate is referred to as being "on" another element, it can be directly on the other element, or an intervening element may also be present. It will also be understood that, when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value.

In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

It should be understood that, in the specification, when the range refers to a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13% as well as 30%, and any sub-ranges of 10% to 15%, 12% to 18%, or 20% to 30%, as well as any figures, such as 10.5%, 15.5% and 25.5%, between appropriate integers that fall within the range.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, the present invention will be described in detail with reference to the accompanying drawings.

Figure 2:
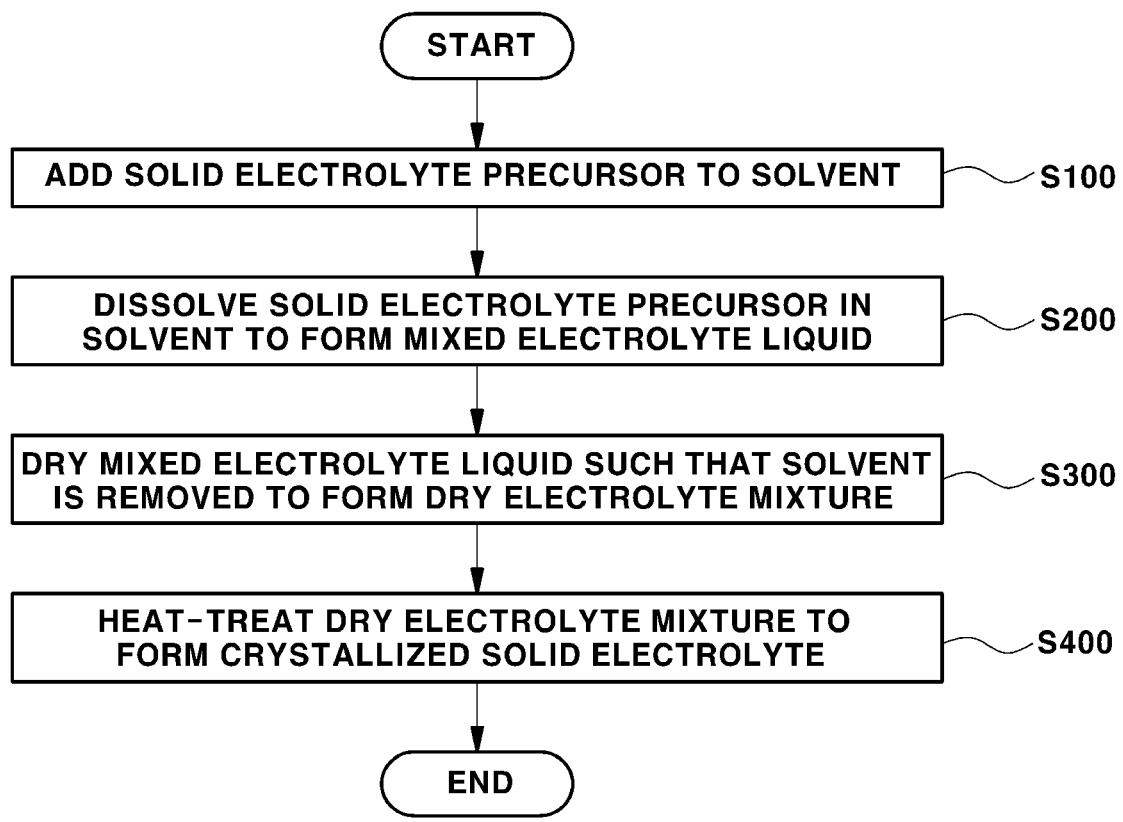
FIG. 2 is a flowchart schematically showing an exemplary method of manufacturing an exemplary solid electrolyte for an exemplary all-solid cell according to an exemplary embodiment of the present invention.

FIGS. 1 and 2 are an exemplary processing and a flow-chart schematically showing an exemplary method of manufacturing an exemplary solid electrolyte for exemplary all-solid cells according to an exemplary embodiment of the present invention.

As shown in FIG. 1, a method of manufacturing a solid electrolyte for all-solid cells may be greatly different from a conventional manufacturing method in that the solid electrolyte is manufactured using a solution method, without performing a milling process. For example, the method of manufacturing the solid electrolyte may produce a crystallized solid electrolyte at high yield without performing a milling process, thereby enabling energy to be saved. In addition, the formation of impurities due to contamination of balls used in the milling process may maximally be prevented. Furthermore, the method of manufacturing the solid electrolyte according to the present invention has the economical effect of reducing manufacturing costs, since most starting materials used in the conventional milling process are expensive. Meanwhile, in the present invention, the solution method may include following processes. For example, the methods of manufacturing a solid electrolyte may include a process of mixing a solid electrolyte precursor and a solvent, a dissolution and/or reaction process, and a heat treatment process, excluding a milling process.

As shown in FIG. 2, a method of manufacturing a solid electrolyte for all-solid cells according to an exemplary embodiment of the present invention may include a step of forming an electrolyte admixture, for example, by adding a solid electrolyte precursor to a solvent (S100) and dissolving the solid electrolyte precursor in the solvent (S200), a step of drying the electrolyte admixture and removing the solvent to form a dry electrolyte mixture (S300), and a step of heat-treating the dry electrolyte mixture to form a crystallized solid electrolyte (S400).

Particularly, in the method of manufacturing the solid electrolyte according to the present invention, the solid electrolyte precursor may suitably include one or more selected from the group consisting of a lithium (Li) element, a sulfur (S) element, a phosphorus (P) element, a brome (Br) element, an iodine (I) element, lithium sulfide ($Li_2S$), phosphorus pentasulfide ($P_2S_5$), lithium bromide (LiBr), lithium chloride (LiCl), and lithium iodide (LiI). In particular, a lithium (Li) element, a sulfur (S) element, lithium sulfide ($Li_2S$), and phosphorus pentasulfide ($P_2S_5$) may be included in the solid electrolyte precursor. However, the present invention is not limited thereto.

The solvent may suitably include one or more selected from the group consisting of ethanol, propanol, butanol, dimethyl carbonate, ethyl acetate, tetrahydrofuran, 1,2-dimethoxyethane, propylene glycol dimethyl ether, and acetonitrile. In particular, acetonitrile may be suitably included in the solvent of the present invention. However, the present invention is not limited thereto.

In the step of dissolving the solid electrolyte precursor in the solvent to form the mixed electrolyte liquid (S200), the composition ratio (molar ratio) of lithium (Li):phosphorus (P):sulfur (S):chlorine (Cl) in the mixed electrolyte liquid may be about 6:1:5:1. However, the present invention is not limited thereto.

In the step of drying the mixed electrolyte liquid such that the solvent is removed to form the dry electrolyte mixture (S300), which is performed after the step of dissolving the solid electrolyte precursor in the solvent to form the mixed electrolyte liquid (S200), the mixed electrolyte liquid may be dried at a temperature of about 25° C. to 200° C. When the mixed electrolyte liquid is dried at a temperature less than about 25° C., the mixed electrolyte liquid may not be sufficiently dried. When the mixed electrolyte liquid is dried at a temperature greater than about 200° C., the composition of the finally manufactured solid electrolyte may vary due to non-uniform vaporization of the mixed electrolyte liquid. As a result, a solid electrolyte having ion conductivity or discharge capacity less than intended and a cell including such a solid electrolyte may be manufactured. For these reasons, the process of drying the mixed electrolyte liquid may be performed, for example, at a temperature of about 25° C., 50° C., 100° C., 150° C., or 200° C. However, the present invention is not limited thereto.

In addition, the drying process may be performed for about 1 to 3 hours. For example, the process of drying the mixed electrolyte liquid may be performed using a vacuum-drying apparatus at a temperature of about 25° C. for about 1 to 3 hours, at a temperature of about 50° C. for about 1 to 3 hours, at a temperature of about 100° C. for about 1 to 3 hours, at a temperature of about 150° C. for about 1 to 3 hours, or at a temperature of about 200° C. for about 1 to 3 hours. However, the present invention is not limited thereto.

When the mixed electrolyte liquid is dried for less than about 1 hour, the mixed electrolyte liquid may not be completely dried. When the mixed electrolyte liquid is dried for greater than about 3 hours, the composition of the finally manufactured solid electrolyte may vary due to non-uniform vaporization of the mixed electrolyte liquid.

In addition, at the step of heat-treating the dry electrolyte mixture to form the crystallized solid electrolyte (S400), which is performed after the step of drying the mixed electrolyte liquid such that the solvent is removed to form the dry electrolyte mixture (S300), the heat treatment process may be performed at a temperature of about 400° C. to 600° C. The crystals of the solid electrolyte may be grown through the process of heat-treating the dry electrolyte mixture.

When the dry electrolyte mixture is heat-treated at a temperature less than about 400° C., the solid electrolyte may be non-uniformly crystallized, whereby the finally manufactured solid electrolyte may have a non-uniform crystalline structure. When the dry electrolyte mixture is heat-treated at a temperature greater than about 600° C., an unintended crystalline phase may appear in the finally manufactured solid electrolyte.

The process of heat-treating the dry electrolyte mixture may be performed, for example, at 400° C., 450° C., 500° C., 550° C., or 600° C. However, the present invention is not limited thereto.

In addition, the solid electrolyte manufactured using the manufacturing method according to the present invention (S100 to S400) may include a crystallized solid electrolyte, and particularly may have an argyrodite-type crystalline structure. Here, the term "argyrodite" may mean a crystalline phase. In particular, the crystallized solid electrolyte manufactured using the manufacturing method according to the present invention (S100 to S400) may have an argyrodite-type crystalline structure including $PS_4^{-3}$. However, the present invention is not limited thereto. For example, the crystallized solid electrolyte manufactured using the manufacturing method according to the present invention (S100 to S400) may have an argyrodite-type crystalline structure including another compound (for example, $Li_6PS_5Cl$).

Meanwhile, when the dry electrolyte mixture is heat-treated at a temperature less than about 400° C., as described above, the solid electrolyte may be non-uniformly crystallized, whereby the amount of argyrodite-type crystals of the solid electrolyte may be reduced, and the solid electrolyte may have a non-uniform crystalline structure. When the dry electrolyte mixture is heat-treated at a temperature greater than about 600° C., on the other hand, an undesired crystalline structure other than the argyrodite-type crystalline structure may be formed in the finally manufactured solid electrolyte. As a result, the ion conductivity or discharge capacity of the solid electrolyte may be reduced.

Figure 3:
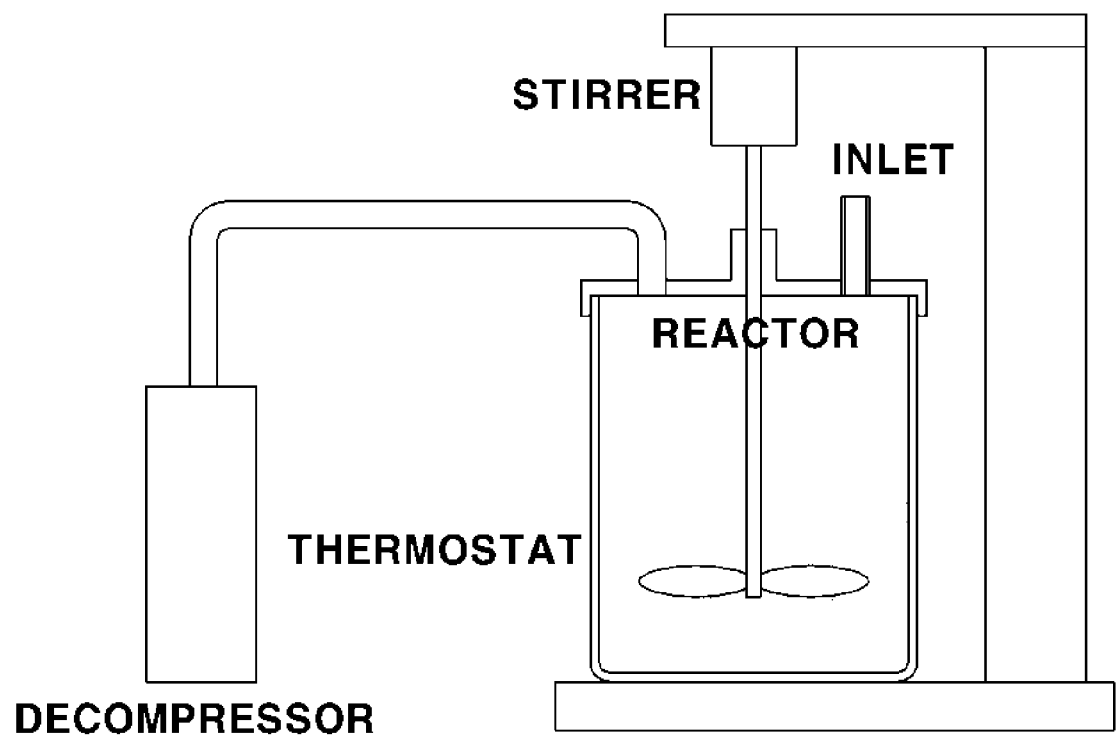
FIG. 3 shows an exemplary apparatus that is used to manufacture an exemplary solid electrolyte for an exemplary all-solid cell according to an exemplary embodiment of the present invention.

FIG. 3 shows an exemplary apparatus that is used to manufacture a solid electrolyte for exemplary all-solid cells according to an exemplary embodiment of the present invention. For the convenience of description, the difference from what has been described with reference to FIGS. 1 and 2 will be described.

As shown in FIG. 3, some or all of the steps of the manufacturing method according to the present invention (see S100 to S400 of FIG. 2) described above may be performed by a manufacturing apparatus. The manufacturing apparatus may include a reactor, an inlet formed above the reactor, a stirrer for stirring a material in the reactor, a thermostat formed on the outer surface of the reactor, and a decompressor connected to the interior of the reactor. For example, a solid electrolyte precursor and a solvent may be supplied into the reactor through the inlet. In the reactor, the solid electrolyte precursor and the solvent may be stirred at a predetermined speed by the stirrer so as to be mixed and dissolved (see S100 and S200 of FIG. 2). In addition, the mixing and dissolution may be performed at a predetermined temperature and/or a predetermined pressure by the thermostat and/or the decompressor.

In an aspect, an all-solid cell may include a positive electrode, a negative electrode, and a solid electrolyte layer including a solid electrolyte manufactured using the manufacturing method (see S100 to S400 of FIG. 2) described above. The all-solid cell according to an exemplary embodiment of the present invention may include a solid electrolyte layer including a solid electrolyte manufactured using the manufacturing method (see S100 to S400 of FIG. 2) described above, a positive electrode disposed on a first surface of the solid electrolyte layer, the positive electrode including the solid electrolyte, and a negative electrode disposed on a second surface of the solid electrolyte layer. The first surface and the second surface are opposite surfaces so as the negative electrode may be disposed on the opposite surface of the positive electrode.

Particularly, in an exemplary all-solid cell according to the present invention, the positive electrode may further include an active material (for example, a positive electrode active material including niobium (Nb)) and a conductive agent (for example, a conductive agent containing carbon (C)), in addition to the solid electrolyte manufactured using the manufacturing method (see S100 to S400 of FIG. 2) described above. Also, in the exemplary all-solid cell according to the present invention, the negative electrode may include a lithium (Li) element.

EXAMPLE

Hereinafter, the present invention will be described in more detail with reference to examples and evaluation examples. However, the following examples are merely illustrations to assist in understanding the present invention, and the present invention is not limited by the following examples.

Example 1

Manufacture of Solid Electrolyte for All-Solid Cells

The following steps were performed in order to manufacture a solid electrolyte using a solution method.

Li powder (Sigma Aldrich Company), S powder (Sigma Aldrich Company), $P_2S_5$ powder (Sigma Aldrich Company), and LiCl powder (Sigma Aldrich Company) were used as starting materials. 1.29 g of Li powder, 2.98 g of S powder, 4.14 g of $P_2S_5$ powder, and 1.57 g of LiCl powder were weighed so as to have the same composition ratio (molar ratio) as $Li_6PS_5Cl$, and were mixed to prepare a powder mixture. The powder mixture and 100 g of an acetonitrile solvent were supplied into a 100 ml reactor (see the reactor of FIG. 3), and were mixed to manufacture a mixed solution. The mixed solution was vacuum-dried at a temperature of about 200° C. for 2 hours to remove residual acetonitrile. Subsequently, the dry powder mixture was heat-treated at a temperature of 550° C. for 5 hours to crystallize the dry powder mixture, whereby a solid electrolyte was obtained.

Example 2

Manufacture of All-Solid Cell Including Solid Electrolyte

The solid electrolyte manufactured as described above was compressed to form a solid electrolyte layer having a thickness of 500 μm. Powder including an active material (NCM622 coated with niobium(Nb)), a solid electrolyte having the same composition as the solid electrolyte used for the solid electrolyte layer, and a conductive agent (Super C) was used as a positive electrode. The positive electrode was formed on one surface of the solid electrolyte layer so as to have an active material loading amount of 5.8 $mg/cm^2$ and a thickness of 30 μm. Lithium foil having a thickness of 100 μm was used as a negative electrode. The negative electrode was formed on the other surface of the solid electrolyte layer so as to be opposite the positive electrode.

Evaluation Example 1

Analysis of Solid Electrolyte Using Raman Spectroscopy

Figure 4:
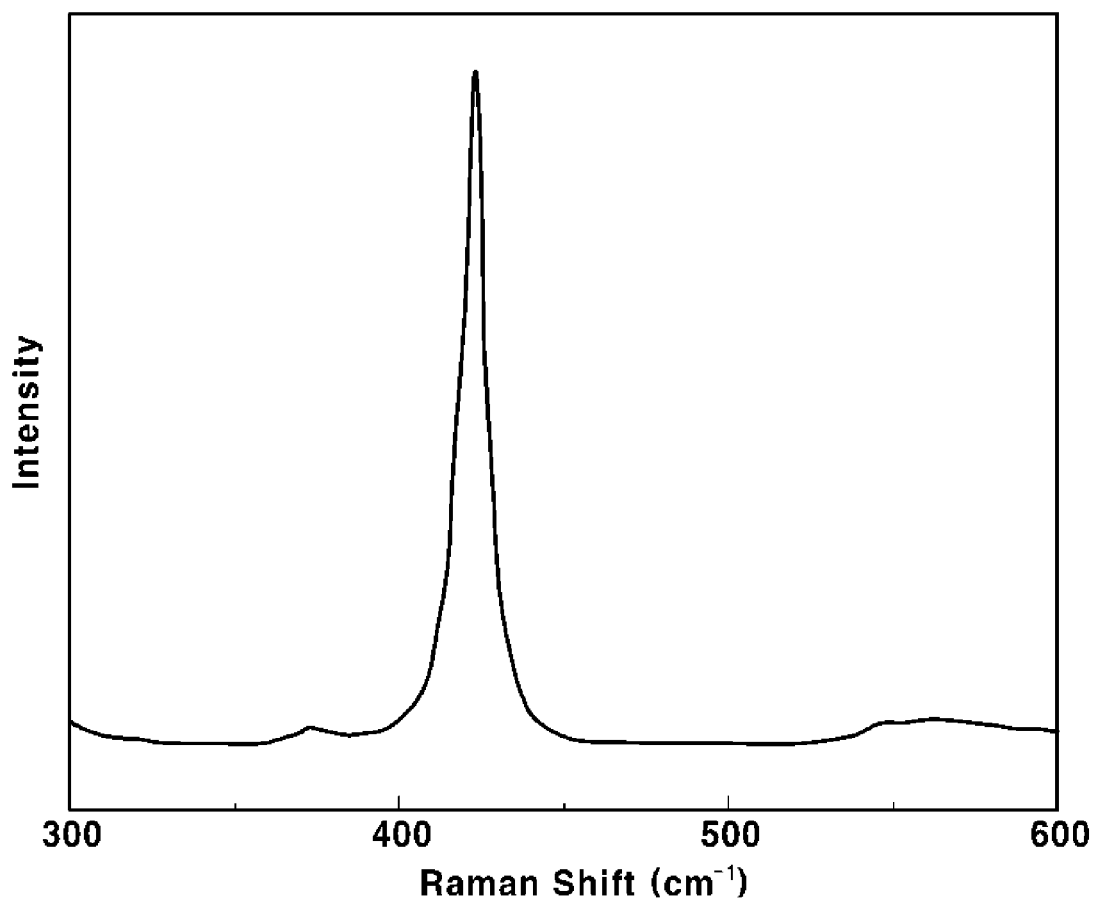
FIG. 4 is a Raman graph of a solid electrolyte for an exemplary all-solid cell according to an exemplary embodiment of the present invention.

In FIG. 4, $PS_4^{-3}$ crystals were formed in the mixture of the solid electrolyte manufactured according to Example 1. This means that when a solid electrolyte is manufactured using the solution method according to the present invention, the crystalline-phase frame of a solid electrolyte precursor is formed.

Evaluation Example 2

Measurement of Lithium Ion Conductivity of Solid Electrolyte

The solid electrolyte manufactured according to Example 1 was compressed to form a sample for measurement (having a diameter of 13 mm and a thickness of 0.6 mm). An alternating-current potential of 10 mV was applied to the sample, and then a frequency sweep of $1 \times 10^6$ to 100 Hz was performed to measure an impedance value, from which lithium ion conductivity was determined. The determined lithium ion conductivity of the sample including the solid electrolyte manufactured according to Example 1 was $1.0 \times 10^{-3}$ S/cm. This means that the solid electrolyte according to the present invention exhibits high ion conductivity.

Evaluation Example 3

Figure 5:
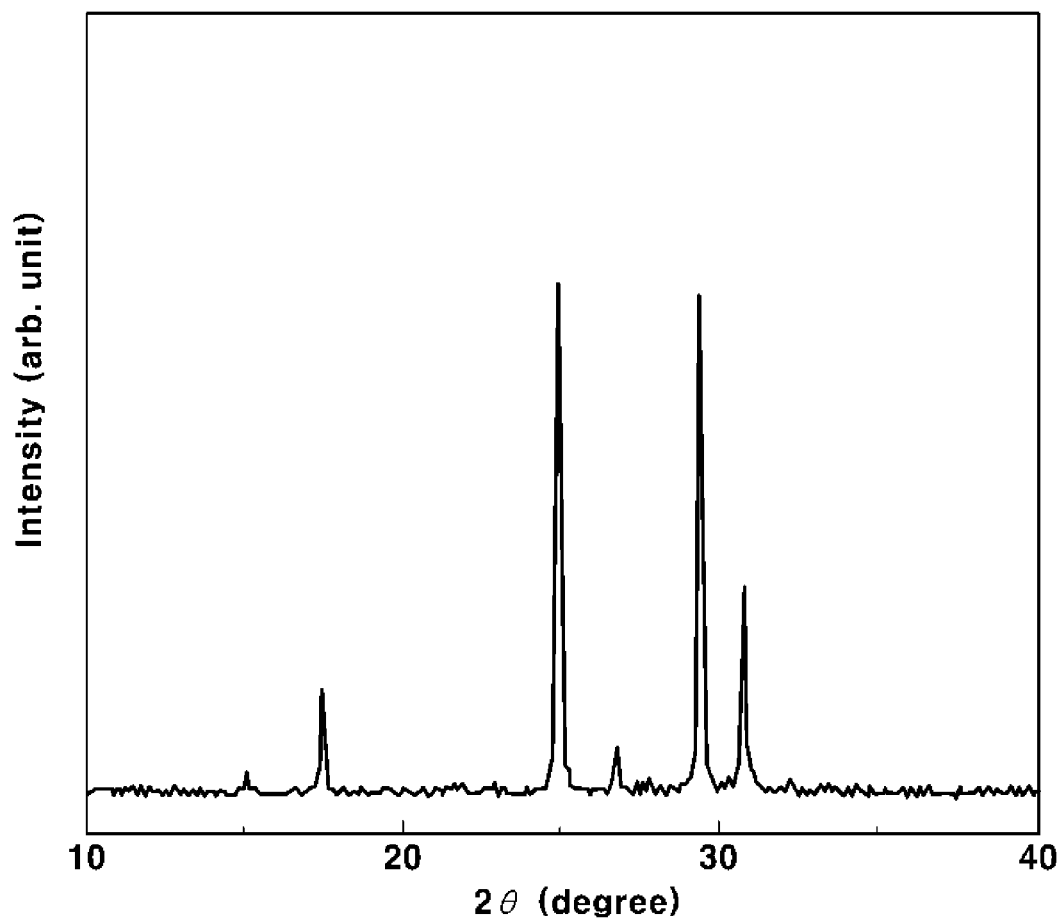
FIG. 5 shows the results of X-ray diffraction analysis based on X-ray diffraction spectroscopy (XRD) of an exemplary solid electrolyte for an exemplary all-solid cell according to an exemplary embodiment of the present invention.

X-Ray Diffraction Analysis Based on X-Ray Diffraction Spectroscopy (XRD) of Solid Electrolyte In FIG. 5, argyrodite-crystalline-phase peaks were present in an XRD image of the solid electrolyte manufactured according to Example 1. An argyodite crystalline phase can be formed in the solid electrolyte using the solution method according to the present invention.

Evaluation Example 4

Measurement of Discharge Capacity of All-Solid Cell

Figure 6:
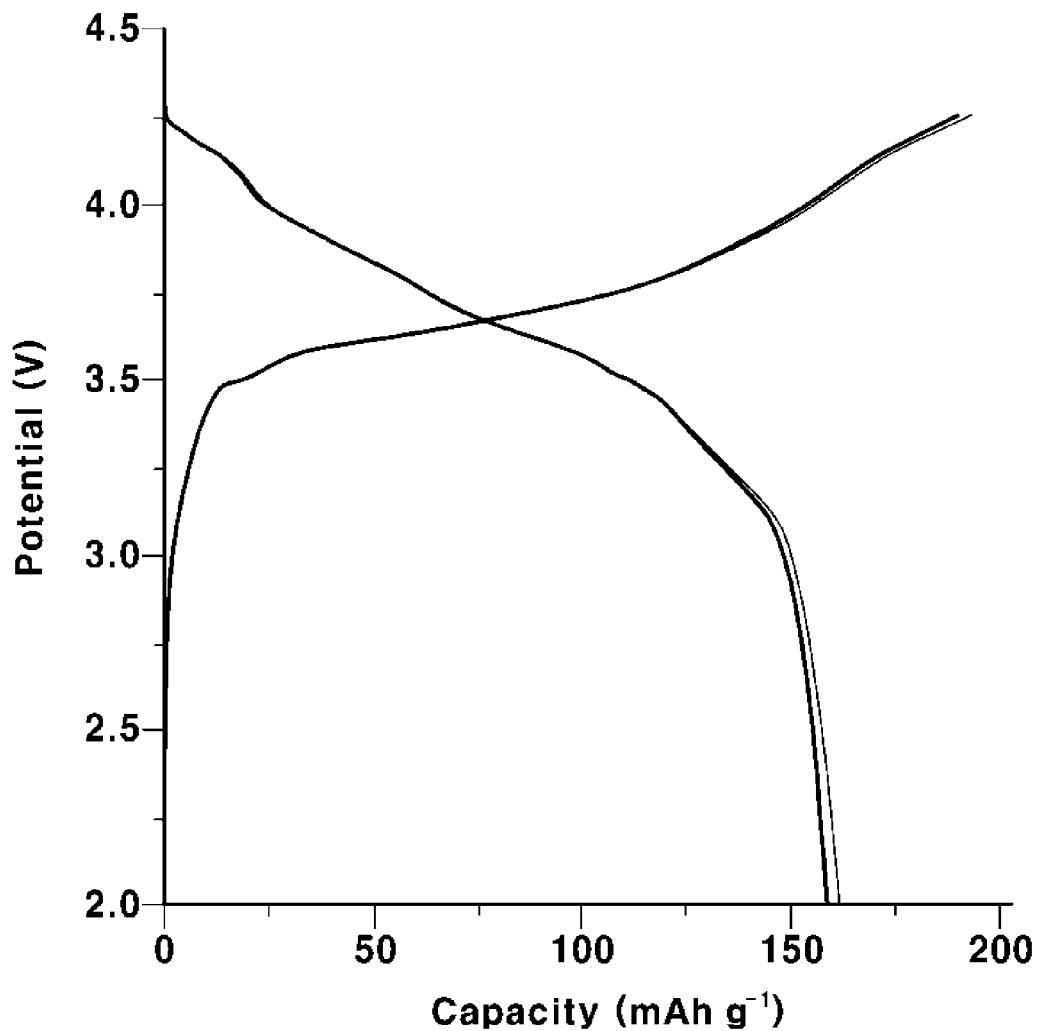
FIG. 6 shows the results of measurement of the discharge capacity of an exemplary all-solid cell, to which an exemplary solid electrolyte for an exemplary all-solid cell according to an exemplary embodiment of the present invention is applied, after the all-solid cell is charged and discharged.

The measured discharge capacity of the all-solid cell manufactured according to Example 2 is shown in FIG. 6. The all-solid cell was charged and discharged under conditions of a C rate of 0.02 C, a voltage of 2.0 V to 3.58 V, and a constant current (CC) to measure the discharge capacity thereof. In FIG. 6, the all-solid cell manufactured according to Example 2 had a discharge capacity of about 160 mAh/g. This means that the solid electrolyte and the all-solid cell manufactured according to the manufacturing method of the present invention exhibit very excellent performance.

As apparent from the foregoing, a method of manufacturing a solid electrolyte according to exemplary embodiments of the present invention may produce a crystallized solid electrolyte at substantially improved yield.

In addition, the crystallized solid electrolyte may be produced without performing a milling process, thereby enabling energy to be saved during the manufacture of the solid electrolyte.

In addition, the crystallized solid electrolyte may be produced without using expensive starting materials used in a conventional milling process, whereby manufacturing costs are reduced.

The effects of the present invention are not limited to those mentioned above. It should be understood that the effects of the present invention include all effects that can be inferred from the foregoing description of the present invention.

Although the specific embodiments of the present invention have been described and shown, those skilled in the art will appreciate that the present invention is not limited to the described embodiments and that various modifications are possible without departing from the gist of the present invention defined in the claims. Therefore, it should be noted that such modifications cannot be individually understood from the technical concept or aspects of the present invention, and it should be understood that such modifications fall within the scope of the claims of the present invention.

What is claimed is:

1. A method of manufacturing a solid electrolyte for all-solid cells, comprising:
   preparing an electrolyte admixture comprising a solid electrolyte precursor and a solvent;
   drying the electrolyte admixture and removing the solvent to form a dry electrolyte mixture; and
   heat-treating the dry electrolyte mixture to form a crystallized solid electrolyte,
   wherein the crystallized solid electrolyte has an argyrodite-type crystalline structure.

2. The method according to claim 1, wherein the solid electrolyte precursor is dissolved in the solvent.

3. The method according to claim 1, wherein no milling process is performed.

4. The method according to claim 1, wherein the solid electrolyte precursor comprises one selected from the group consisting of a lithium (Li) element, a sulfur (S) element, a phosphorus (P) element, a brome (Br) element, an iodine (I) element, lithium sulfide ($Li_2S$), phosphorus pentasulfide ($P_2S_5$), lithium bromide (LiBr), lithium chloride (LiCl), lithium iodide (LiI) and a combination thereof.

5. The method according to claim 1, wherein the solvent comprises one or more selected from the group consisting of ethanol, propanol, butanol, dimethyl carbonate, ethyl acetate, tetrahydrofuran, 1,2-dimethoxyethane, propylene glycol dimethyl ether, and acetonitrile.

6. The method according to claim 3, wherein the electrolyte admixture comprises lithium (Li), phosphorus (P), sulfur (S), and chlorine (Cl) at a molar ratio of about 6:1:5:1.

7. The method according to claim 1, wherein the drying is performed at a temperature of about 25° C. to 200° C. for about 1 to 3 hours.

8. The method according to claim 1, wherein the heat treatment is performed at a temperature of about 400° C. to 600° C.

9. The method according to claim 1, wherein the crystallized solid electrolyte has an argyrodite-type crystalline structure comprising $PS_4^{-3}$.

10. A solid electrolyte manufactured using the method according to claim 1.

11. An all-solid cell comprising:
    a solid electrolyte layer comprising the solid electrolyte according to claim 10;

a positive electrode disposed on a first surface of the solid electrolyte layer, the positive electrode comprising the solid electrolyte; and a negative electrode disposed on a second surface of the solid electrolyte layer, wherein the first surface and the second surface of the solid electrolyte layer are opposite surfaces.

12. The all-solid cell according to claim 11, wherein the positive electrode further comprises an active material and a conductive agent, and the negative electrode comprises a lithium (Li) element.

13. A vehicle comprising an all-solid cell according to claim 11.

* * * * *